US005269637A

United States Patent [19]

Gomes, Jr.

[11] Patent Number: 5,269,637

[45] Date of Patent: Dec. 14, 1993

[54] SINGLE-LOOP DUST SEPARATION CYCLONE

[75] Inventor: Durval Gomes, Jr., Sao Paulo - SP, Brazil

[73] Assignee: Serrana S/a De Mineracao, Sao Paulo, Brazil

[21] Appl. No.: 887,736

[22] Filed: May 22, 1992

[30] Foreign Application Priority Data

May 24, 1991 [BR] Brazil .................................. 9102123

[51] Int. Cl.[5] .............................................. B65G 53/18

[52] U.S. Cl. .................................... 406/173; 209/144; 55/419; 55/459.1

[58] Field of Search ............... 406/173; 55/419, 459.1; 209/144, 143

[56] References Cited

U.S. PATENT DOCUMENTS

| | | | |
|---|---|---|---|
| 4,285,142 | 8/1981 | Suzuki et al. | 55/459.1 |
| 4,378,234 | 3/1983 | Suzuki et al. | 209/144 X |
| 4,450,071 | 5/1984 | Trozzi | 209/144 |
| 4,900,345 | 2/1990 | le Jeune | 209/144 |

FOREIGN PATENT DOCUMENTS

| | | | |
|---|---|---|---|
| 2153398 | 5/1973 | Fed. Rep. of Germany | 55/459.1 |
| 49817 | 3/1984 | Japan | 55/459.1 |
| 513834 | 1/1938 | United Kingdom | 209/144 |

*Primary Examiner*—David M. Mitchell
*Assistant Examiner*—Gary C. Hoge
*Attorney, Agent, or Firm*—Darby & Darby

[57] ABSTRACT

A dust-separation cyclone is disclosed which includes a volute-shaped separation chamber constructed so that the path of dust containing gas circulating therein describes substantially one single loop, and the gas flow is separated into two separate sub-streams. The separation chamber is constructed so as to include two lobes, with each lobe providing an airflow path for a different one of the sub-streams to an outlet passageway. The flow path within the lobes is substantially symmetrical about a pre-defined plane and the lobes are shaped so as to unite the sub-streams after substantially a single loop of flow along the path. The united sub-streams are then provided to the outlet passageway.

11 Claims, 5 Drawing Sheets

SINGLE-LOOP DUST SEPARATION CYCLONE

FIELD OF THE INVENTION

The present invention relates generally to cyclones and, more particularly, concerns a single-loop dust separation cyclone, which has the purpose of reducing as much as possible the pressure drop and, consequently, the energy required to move the gases through the cyclone, without impairing the efficiency of separation of the dust in suspension in same.

BACKGROUND OF THE INVENTION

The low pressure drop dust separation cyclone of the present invention is preferably employed in the crude mix pre-heating tower for the production of Portland cement clinker. It was developed to minimize the power consumption of the gas exhaustors of the pre-heating set, by simplifying the gas path and minimizing the turbulence. Owing to its physical configuration that eliminates dust deposition, it also substantially improves the pressure. The pressure drop measured in conventional equipment is 10 millibars and that measured in a cyclone in accordance with the present invention it reaches 5 millibars.

In addition to the economy in energy, utilization of the single-loop cyclone reduces the need for space and for installation height, in comparison with conventional cyclones, which results in economy in the supporting structure of the installation.

BRIEF DESCRIPTION OF THE DRAWINGS

In order to better understand the physical structure of the single-loop cyclone, its advantages and the objectives achieved by its utilization, reference should be made to the schematic drawings, which are an integral part of this specification as well, and to the descriptive material which accompanies them, in which drawings are illustrated and detailed.

DETAILED DESCRIPTION OF THE PREFERRED EMBODIMENT

Figure 1:
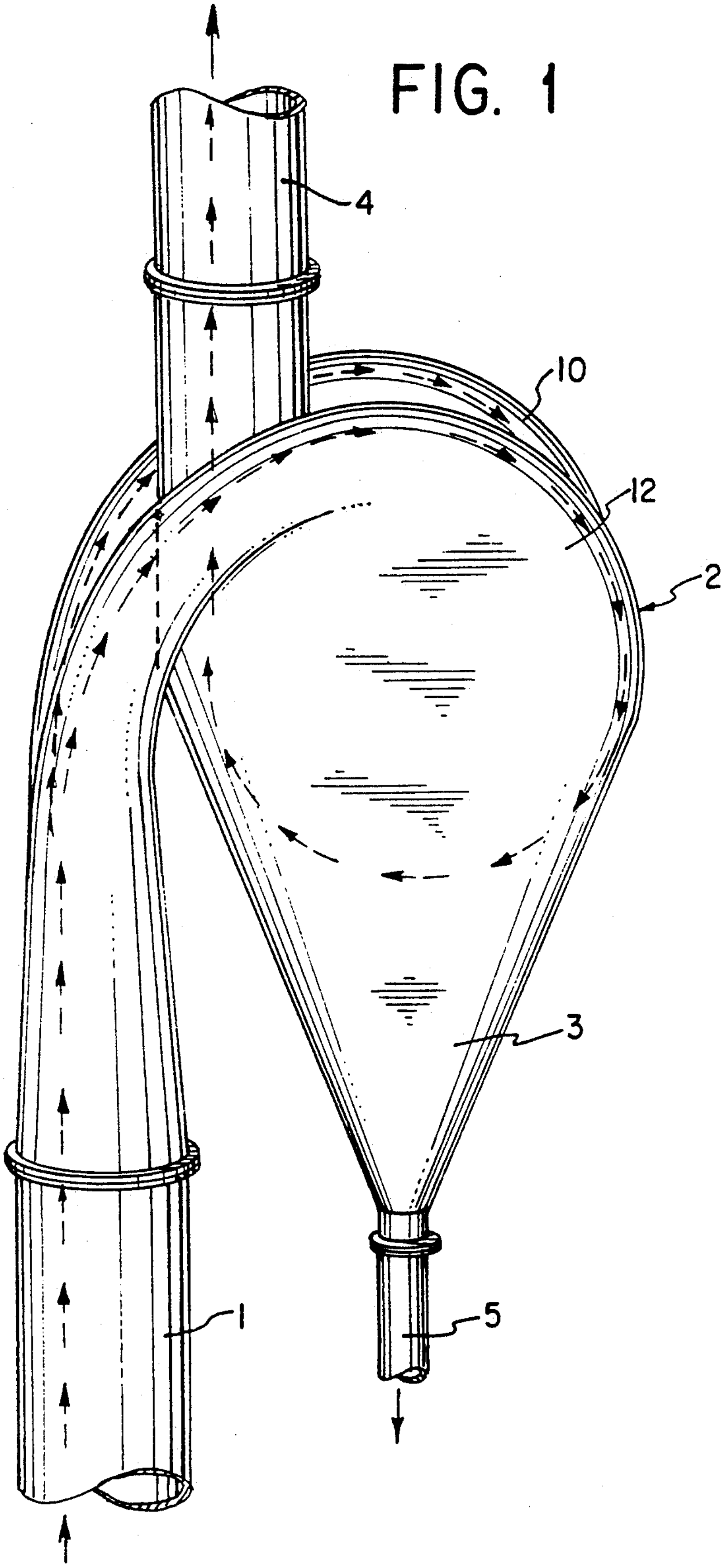
FIG. 1 is a perspective view of a preferred embodiment of a single-loop cyclone in accordance with the present invention illustrating its wall shape and construction.
Figure 2:
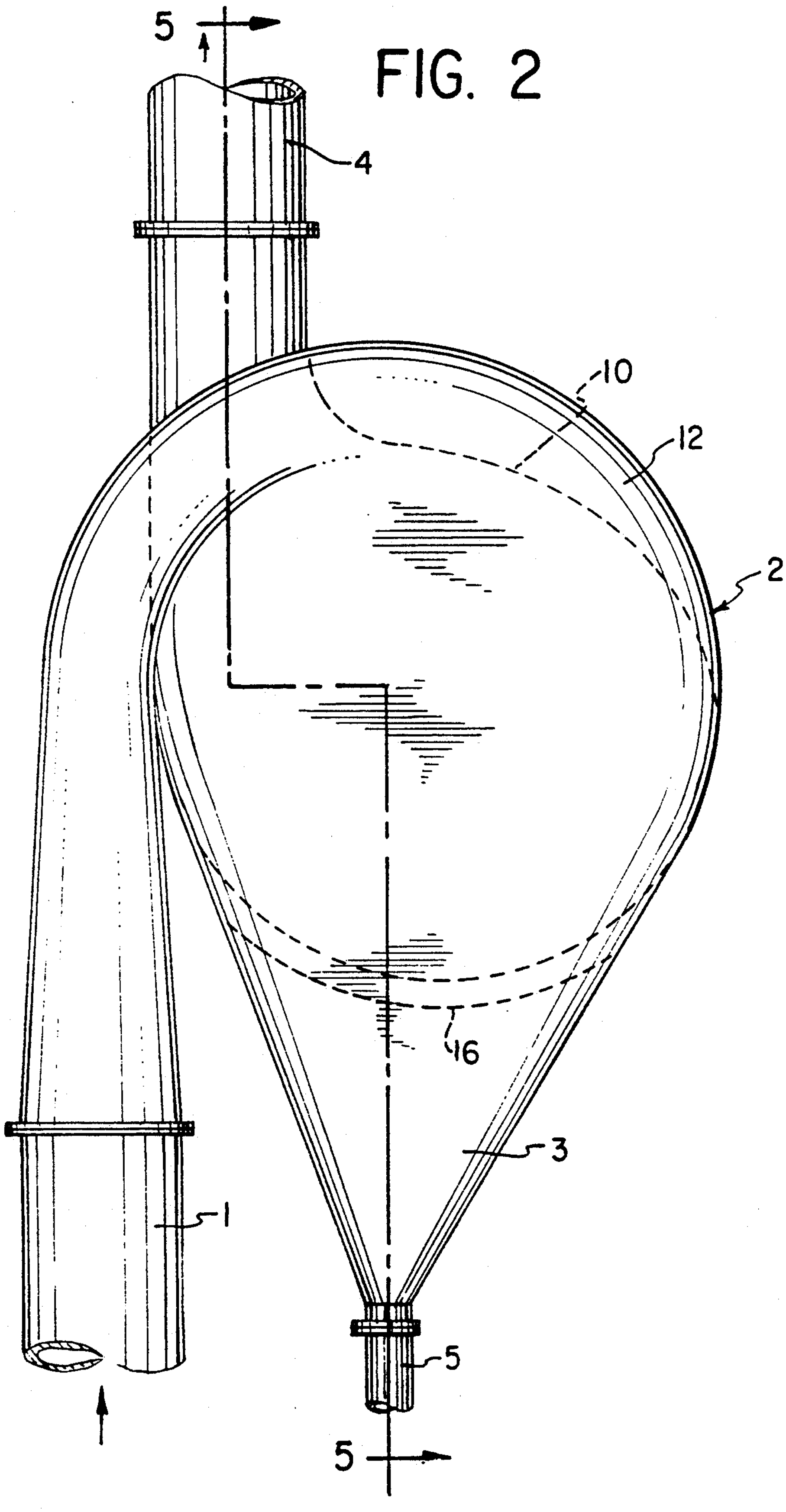
FIG. 2 is a front elevational view of the Cyclone of FIG. 1.

The denomination single-loop results from the fact that the gaseous particles describe one single full loop (360°) between the inlet and the outlet of the gases.

The single-loop Cyclone offers a dust-separation efficiency in the range of 90% in the typical application of the pre-heater tower in a dry cement plant, and may be improved upon the adjustment of gas velocity, depending upon dust granullometry.

As illustrated, in the figures, the single-loop cyclone includes an inlet pipe 1 for the gases with dust in suspension, a separation chamber 2 with a volute profile, a cone 3 to collect the dust separated, an outlet pipe 4 for the clean gases and dust discharge 5.

Figure 3:
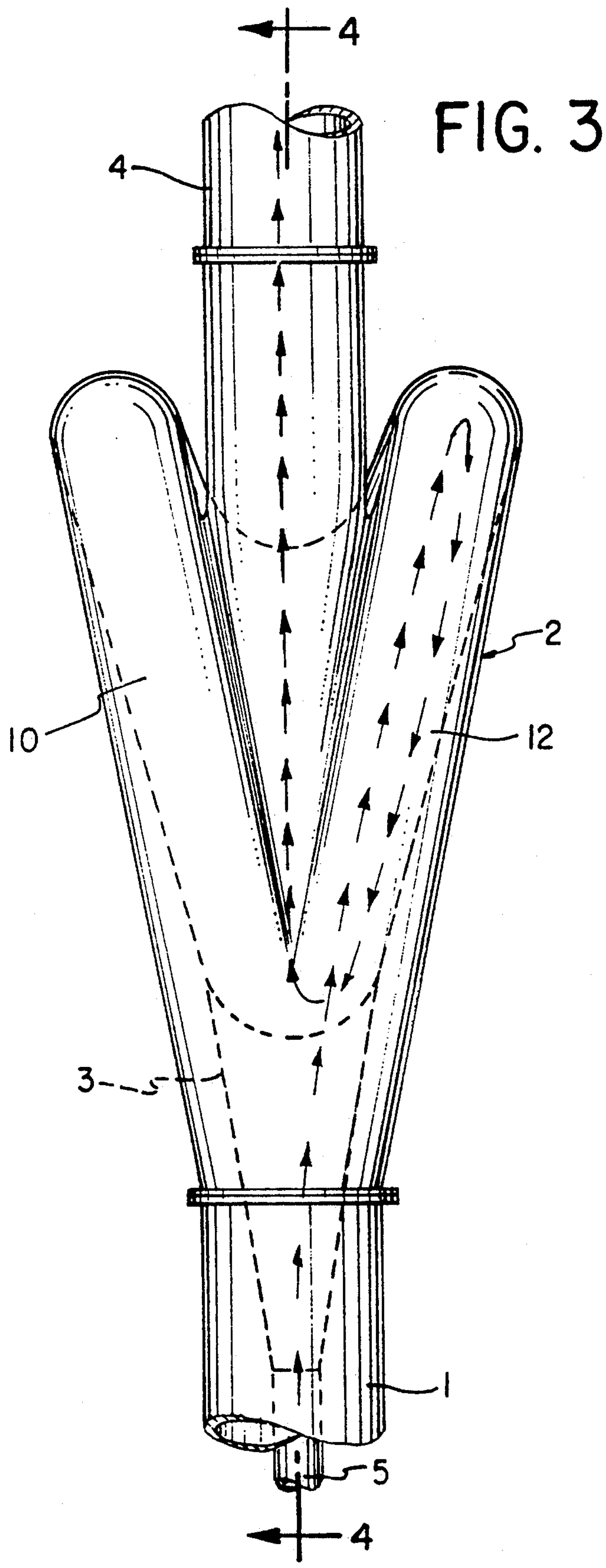
FIG. 3 is a left-side elevational view of the Cyclone.
Figure 4:
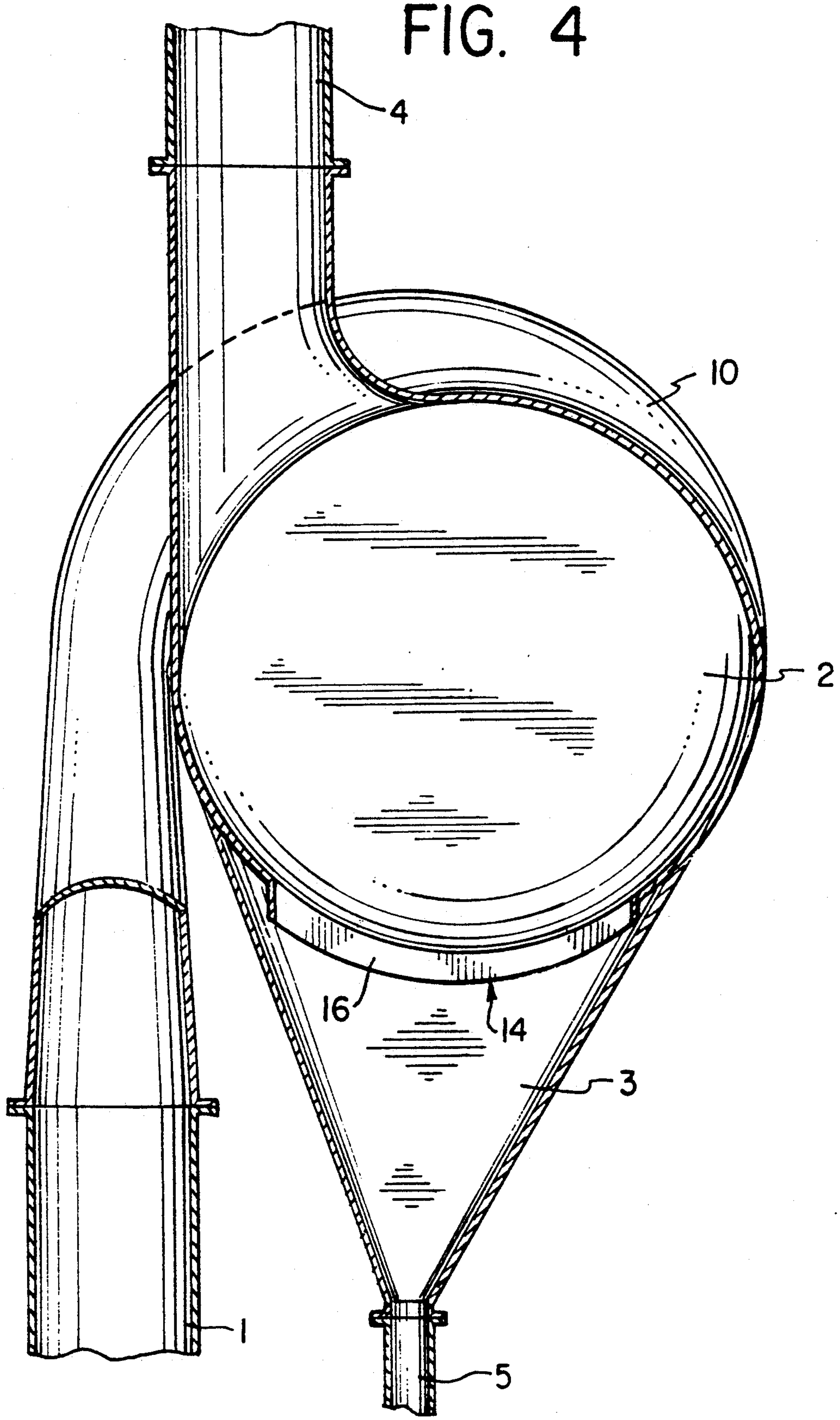
FIG. 4 is a sectional view of the Cyclone taken along line 4—4 in FIG. 3 and looking in the direction of the arrows.
Figure 5:
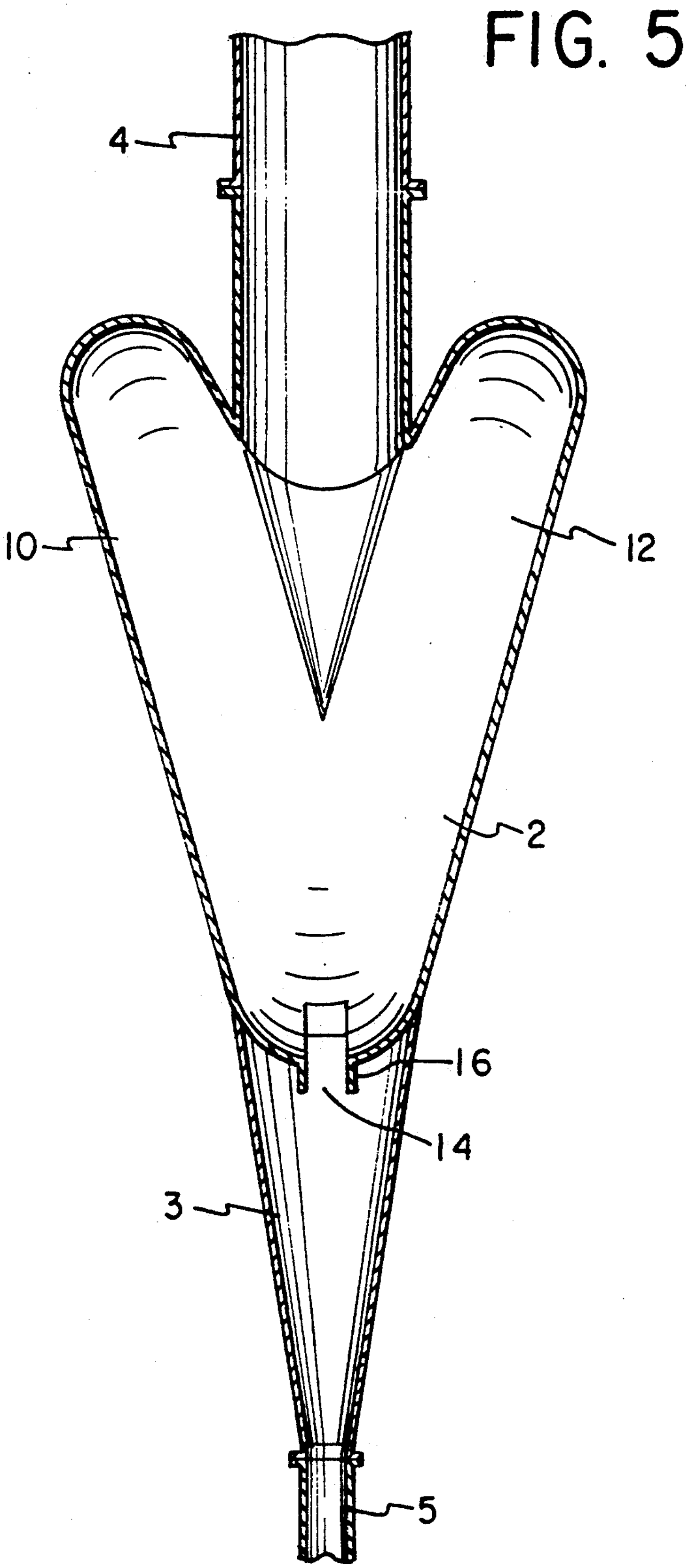
FIG. 5 is sectional view of the Cyclone taken along contour 5—5 in FIG. 2 and looking in the directions of the arrows.

As best seen in FIGS. 1 and 3, in the preferred embodiment, the separation chamber 2 comprises a rear lobe 10, the forward lobe 12. The air stream entering via inlet pipe 1 is separated into two parts which are split between the two lobes, as illustrated by the dotted arrows in FIG. 1. After passing through the two lobes, the two airstreams are once again united into a single airstream which passes out of outlet pipe 4.

Preferably, the lobes 10 and 12 are mirror images of each other which are symmetrical about a plane passing through the axes of pipes 1 and 4 (i.e. perpendicular to the plane of FIG. 3 and passing through the axis of pipe 1. For clarity, FIG. 3 illustrates only the path of the gases passing through front lobe 12. Those skilled in the art will appreciate that the gases passing through rear lobe 10 follow a similar helical path between pipe 1 and pipe 4. Moreover, the gases in each lobe traverse precisely a single loop within the lobe. As is well known, when the gases traverse their loop, particulate matter within the gases is projected against the walls of separation chamber 2 through centrifugal action. Separation chamber 2 contains a bottom opening 14, through which separated particulate matter may drop down into the collection cone 3. Bottom opening 14 is surrounded by a box flange 16 which projects downwardly into the collection cone 3. The air, with the particular material separated out, then exits through pipe 4.

The single-loop Cyclone is built in steel plating with external reinforcements for supporting purposes, and may be coated internally as a function of the application. For utilization in pre-heaters in dry cement plants an internal coating with a double coating is provided, which includes insulating concrete in contact with plating and refractory concrete, which is in contact with the gases. Owing to the complex shape of the interior as illustrated by the drawings, the refractory coating must be applied by means of mechanical projection. The outer plating need not follow the internal shape exactly.

As shown in Table I the pressure drop in a stage of a conventional cyclone in a pre-heating tower in a dry cement plant is 10 mBar (millibars) in comparison with 5 mBar for the equivalent stage with a single-loop Cyclone.

TABLE I

| TYPE | PRESSURE DROP IN mBar |
|---|---|
| Conventional | 10 |
| F.L. SMIDTH, | 6 |
| LOW-PRESSURE | |
| SINGLE-LOOP | 5 |

A number of advantages and characteristics were explained under the equipment description, together with structural and operational details, being completed by the enclosed claims. Changes can be made in details, particularly as refers to the size, supporting structure, constructive material, internal and/or external coatings with the purpose of adjusting the equipment to different applications, but always within the principle of operation, and without departing from the scope and spirit of the accompanying claims.

What is claimed:

1. A single-loop separation cyclone, comprising a volute-shaped separation chamber constructed so that the path of dust containing gas particles circulating therein describes substantially one single loop, a lower inlet passageway defining the arrival point of gases to said loop, said passageway dividing into two substantially symmetrical ducts between which the flow of circulating gas particles is divided to define the start of said loop, said separation chamber being constructed so as to be formed with a pair of substantially symmetrical lobes, each receiving the gas flow from one of said ducts, the lobes being shaped so as to unite the separate gas flows thereof after substantially one single loop of circulation, and an upper outlet passageway for clean gas extending between said ducts and coupled to said chamber so as to receive the united gas flows, said outlet passageway defining the end of said loop.

2. A cyclone is accordance with claim 1, wherein said separation chamber is shaped so as to provide a helical path comprising 360° of rotation between said inlet passageway and said outlet passageway.

3. The cyclone of claim 1 wherein each of the lobes is shaped so that gas flow therein follows a helical path and the flow paths of the two lobes are about a common axis.

4. The cyclone of claim 1 wherein said separation chamber includes an elongated opening between the chamber and a collection cone disposed therebelow, said opening extending along the direction of flow, and a wall protruding from said opening into said collection cone, said wall surrounding said opening and serving as a perimeter boundary therefor.

5. In a separation cyclone of the type utilized to remove particulate material from an air stream, the cyclone being of the type including an inlet passageway for gases containing particulate material, a separation chamber for the rotary circulation of said gases, and an outlet for clean gas from which particulate material has been removed, the improvement comprising said separation chamber being constructed so as to produce a volute-shaped airflow between said inlet and outlet passageways, the path of airflow forming substantially a single loop in its passage through the separation chamber, means for separating the airflow in said inlet passageway into two separate air sub-streams, said separation chamber being constructed so as to include two lobes, each lobe providing an airflow path for a different one of said air sub-streams to said outlet passageway, the airflow path of said lobes being substantially symmetrical about a predefined plane, said lobes being shaped so as to unite said substreams after substantially one single loop of flow along said path, the united substreams being provided to said outlet passageway.

6. The cyclone of claim 5 wherein said airflow path is helical and includes 360° of rotation between said inlet and outlet passageways.

7. The cyclone of claim 5 wherein said outlet passageway is symmetrical about said predefined plane.

8. The cyclone of claim 5 wherein said inlet passageway is symmetrical about said predefined plane.

9. The cyclone of claim 5 wherein said inlet passageway is below said outlet passageway.

10. The cyclone of claim 5 wherein each of the lobes is shaped so that gas flow therein follows a helical path and the flow paths of the two lobes are about a common axis.

11. The cyclone of claim 5 wherein said separation chamber includes an elongated opening between the chamber and a collection cone disposed therebelow, said opening extending along the direction of flow, and a wall protruding from said opening into said collection cone, said wall surrounding said opening and serving as a perimeter boundary therefor.

* * * * *